United States Patent [19]

Smirl

[11] 4,265,135
[45] May 5, 1981

[54] AUTOMOTIVE ACCESSORY DRIVE

[75] Inventor: Richard L. Smirl, Arlington Heights, Ill.

[73] Assignee: Borg-Warner Corporation, Chicago, Ill.

[21] Appl. No.: 964,218

[22] Filed: Nov. 27, 1978

[51] Int. Cl.³ .............................................. F16H 5/42
[52] U.S. Cl. ................................ 74/336 B; 74/752 C; 192/0.033; 192/82 T
[58] Field of Search .............. 74/781 R, 336 B, 751, 74/752 R, 752 A, 752 C, 752 D, 752 E; 192/0.03, 0.033, 7, 104 F, 82 T

[56] References Cited

U.S. PATENT DOCUMENTS

| 2,943,517 | 7/1960 | Markley et al. | 74/750 R |
| 3,469,473 | 9/1969 | Forster et al. | 74/752 D X |
| 3,487,726 | 1/1970 | Burnett | 74/781 R |
| 3,747,731 | 7/1973 | Smirl | 192/104 R |
| 3,773,153 | 11/1973 | Smirl | 188/218 X L |
| 4,098,148 | 7/1978 | Wayman | 74/752 C X |

Primary Examiner—C. J. Husar
Assistant Examiner—Frank McKenzie
Attorney, Agent, or Firm—Aubrey L. Burgess

[57] ABSTRACT

A three-phase accessory drive system associated with the engine of a vehicle and providing a high ratio drive phase from vehicle engine idle to a first predetermined engine speed, a substantially constant speed drive phase above the first predetermined engine speed to a second predetermined engine speed and a low ratio drive phase above the second predetermined engine speed. The accessory drive speed is also temperature compensated.

The drive system comprises the combination of a planetary gear set, a friction brake, a friction clutch and a hydraulic system operatively associated with the brake.

7 Claims, 2 Drawing Figures

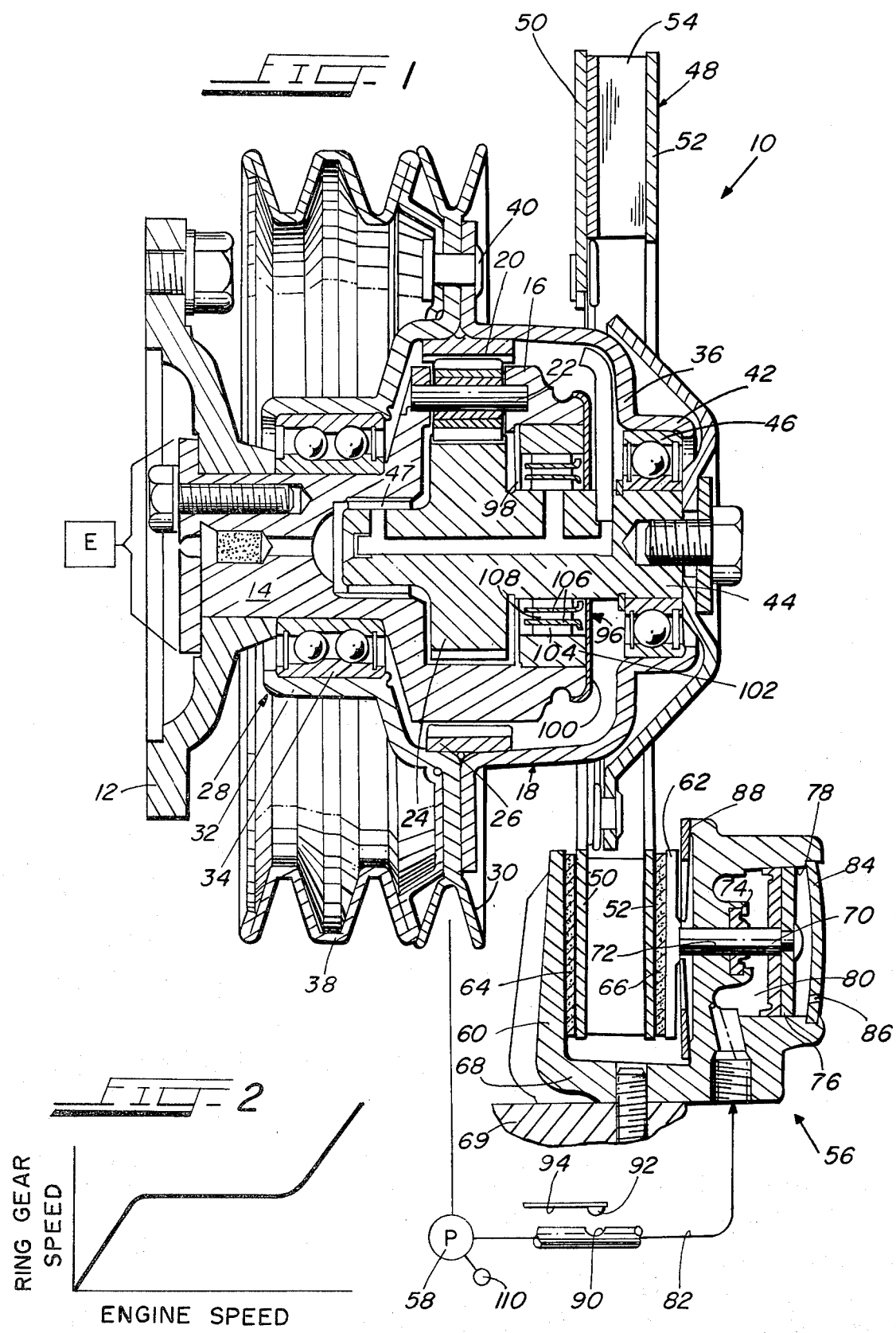

AUTOMOTIVE ACCESSORY DRIVE

BACKGROUND OF THE INVENTION

Modern vehicle engines are called upon to drive an increasing number of accessories. In the conventional accessory drive system, the accessories are driven at a linear ratio which may differ from that of the speed of the engine but which may reach levels at which the accessory is inefficient and which may require accessory construction for strength and size which would not be necessary if driven in a different manner. Driving accessories at high speeds results in a substantial decrease in the efficiency of a vehicle because a substantial percentage of the output is required to drive the accessories, which can amount to about 30% of the engine horsepower at moderate vehicle speeds.

The problem of efficiency decrease becomes even more severe in some modern, low horsepower engines which must operate at relatively high speeds. The lack of efficiency of the system requires the use of more gasoline—a needless and serious waste of energy.

Various types of accessory drives have been proposed. Some are merely temperature responsive only, and thus intermittent, and not suitable for alternator or generator devices which must be driven continuously. Others are too expensive.

THE INVENTION

According to this invention, there is provided a compact, three-phase accessory drive suitable for automotive use, and being compact, fitting into the smaller vehicles without body modification. The accessory drive provides a first phase of a high ratio drive from vehicle engine idle to a first predetermined engine speed as, for example, 2,000 rpm. for a vehicle engine, a second phase comprising a substantially constant speed drive from the first predetermined engine speed to a second predetermined engine speed as, for example, 3,000 rpm. for a vehicle engine, and a third phase comprising a low ratio drive above the second predetermined engine speed. In addition to being speed-responsive, the drive of this invention is temperature compensated, so as to operate uniformly under various temperature conditions.

The drive system comprises the combination of a planetary gear set, a friction brake, a one-way clutch and a hydraulic system operatively associated with the vehicle engine and the brake. In the system, the planet gears of the gear set are drivingly connected to the crankshaft of the engine, the ring gear has one or more pulleys connected thereto and provides the drive to one or more vehicle accessories, each of which can be driven at an independent ratio depending upon the relative sizes of the pulleys, and the sun gear is connected to the friction brake. The hydraulic system comprises a bi-metal controlled orifice and a pump driven by the ring gear which supplies a speed-responsive fluid pressure to a cylinder in which a piston connected to a brake caliper mechanism is located. A disc spring urges the piston and caliper mechanism to engage the friction brake, and the piston urges the caliper mechanism to disengage the friction brake.

During the first phase, the speed-responsive pressures rises slowly and the disc spring holds the brake and sun gear stationary, so that the accessory pulley speed will increase linearly with the engine speed until the first predetermined speed is reached. During the first phase, the drive to the accessory pulleys is through the planet gears and the ring gear, the sun gear being held stationary.

When the speed of the ring gear increases to the first predetermined speed, the speed-responsive fluid pressure to the brake caliper mechanism increases more rapidly permitting the brake and the connected sun gear to rotate and maintain a constant ring gear speed until the sun gear reaches the speed of the planet carrier.

When the sun gear starts to exceed the speed of the planet gear carrier, the one-way clutch locks them together and the drive has reached the second predetermined speed. The ring gear and accessory pulleys then rotate at a rate which increases with the engine speed and the increasing fluid pressure completely releases the brake caliper. This ratio is lower than the initial ratio.

A relief valve at the pump limits the maximum pressure to slightly above that required to completely release the spring loaded brake caliper.

Upon reduction in engine speed, the drive sequence is reversed. The hydraulic system is temperature compensated by the bi-metal element so that the controlled speed increases slightly with temperature.

THE DRAWINGS

FIG. 1 is a sectional and schematic view of the drive system of this invention; and FIG. 2 is a typical output curve using this invention in which ring gear speed is plotted against engine speed.

DETAILED DESCRIPTION

Looking now at the drawings and particularly FIG. 1, there is illustrated an accessory drive 10 which comprises a driving flange 12 adapted to be drivingly connected to a prime mover such as the engine E (schematically shown) of a vehicle and connected to a stub shaft 14 of a planet carrier 16 of a planetary gear set 18. The planetary gear set 18 comprises a plurality of planet gears 20 rotatably supported on shafts 22 carried by the planet carrier 16, a sun gear 24 and a ring gear 26. The ring gear 26 is connected to a pulley-housing assembly generally identified as 28, which, as illustrated, comprises a first pulley member 30 having an axial flange 32 supported by a ball bearing 34, one race of which surrounds the stub shaft 14 and thus permitting relative rotary movement between the pulley 30 and the shaft 14. The assembly 28 also comprises a cup-like housing portion 36 and a multiple pulley section 38 both of which are connected as by rivets 40 to the pulley member 30. A circular portion 42 of the housing portion 36 surrounds a sun gear shaft 44 and a ball bearing 46 is positioned therebetween to permit relative rotation therebetween. The shaft 44 is rotatably supported at one end within the planet carrier 16 by a sleeve bearing 47. Because of the construction described, the pulley-housing assembly 28 will rotate with the ring gear 26.

A friction brake 48 is drivingly connected to the sun gear shaft 44 as is illustrated. The brake comprises spaced annular plates 50, 52 spaced by accordion-pleated, relatively thin metal stock 54, which construction provides for good heat dissipation. The construction of the brake 48 is best illustrated in my U.S. Pat. No. 3,773,153 issued Nov. 20, 1973. To energize the brake 48, a hydraulic actuator 56 is provided which receives fluid under pressure from a pump 58 driven from the ring gear 26 as through the pulley 30. The actuator 56 comprises a pairs of jaws 60, 62 having friction pad facings 64, 66 which engage respectively the plates 50, 52 of the brake 48. The jaw 60 and face 64 are stationary with respect to the actuator frame 68 which is secured to a support 69 while the jaw 62 and face 66 are mounted on a piston shaft 70 movable through an opening 72 in the frame 68, the shaft being hermetically sealed in the opening by a packing element 74. The opposite end of the shaft 70 is connected to a piston 76 movable in an opening 78 in the frame 68. The piston 76 defines a cavity 80 into which fluid under pressure can be introduced via a line or conduit 82 from the pump 58. The other end of the opening 78 is closed by a closure member 84 having an exhaust opening 86 therein.

The jaw 62 and face 66 are urged into engagement with the plate 52 (and also the jaw 60 and face 64 are urged into engagement with the plate 50) by an annular spring 88 positioned between the frame 68 and the jaw 62.

The force of the spring 88 is such to prevent rotation of the brake until the first predetermined engine speed is attained.

When fluid under pressure from the pump 58 is supplied to the cavity 80 at a pressure determined by the speed of the ring gear, the piston 76 is moved against the spring force to a position releasing pressure on the plates 50, 52 thus permitting the brake to rotate, the rate depending upon the pressure by the jaws 60, 62 and pads 64, 66 on the plates 50, 52.

To compensate for changes in the viscosity and thus the flow characteristics of hydraulic fluid because of temperature changes, a bleed orifice 90 is provided in the line or conduit 82 with a valve member 92 mounted on a bi-metal support arm 94. As the temperature increases, the valve member 92 tends to close the orifice 90. As in conventional hydraulic systems, a sump (not shown) is provided as a reservoir for hydraulic fluid and serves as a source for fluid to the pump 58 and any other hydraulic devices and for discharge from the bleed orifice 90.

A one-way friction clutch 96 is located between the sun gear shaft 44 and the planet carrier 16; it is positioned by means of end plates 98, 100. The clutch 96 comprises an outer race 102, a pluarlity of sprags 104, a double cage 106 and a spring 108, part of the shaft 44 acting as an inner race. A relief valve 110 limits the maximum pressure supplied by the pump 58. Such are well known in the art and need not be further described.

As will be noted from the drawings, various lubrication passages are provided for the flow of lubrication to the various parts.

The curve of FIG. 2 is that of accessory speed (or a speed related to accessory speed) plotted against engine speed. The curve shows the three phases of the drive; (1) an increasing linear ratio until the first predetermined engine speed is attained; (2) a generally uniform speed between the first and second predetermined engine speeds; and (3) a linear ratio drive at a different rate than the first phase after the second predetermined engine speed. The uniform speed or second phase of the drive generally corresponds to the usual driving range, i.e., for example, 20 m.p.h. to 55 m.p.h.

In operation, with the engine rotating the planet carrier 16 and the sun gear 24 being held against rotation by the brake 48, the ring gear speed follows that of the first phase and the pulleys 30, 38 rotate accordingly. The speed-responsive pressure from the pump 58 rises slowly and the disc spring 88 holds the brake 56 stationary. When the engine speed increases to above the first predetermined speed, the speed-responsive pressure supplied to the piston cylinder 80 increases more rapidly and the piston 76 begins to move away from the plate 52, permitting the brake 56 and the sun gear 24 to rotate at an increasing speed. A constant ring gear speed (and pulley speed) is maintained until the sun gear 24 reaches the speed of the planet carrier 16. However, until the engine speed is at the second predetermined speed, the pressure to the piston chamber 80 is not sufficient to permit the brake to freely rotate and the pads controllably drag the brake. As the motor speed increases, so does that of the sun gear. When the speed of the sun gear starts to exceed that of the planet carrier—when the engine has reached or exceeded the second predetermined speed—the one-way clutch 96 locks up, thus locking the sun gear and the planet carrier together. The speed-responsive pressure is such to completely release the brake. The drive ratio then increases linearly in the third phase.

I claim:

1. In a drive system adapted to drive the accessories of a prime mover at a constant ratio predetermined speed, then at a substantially constant speed, comprising:
    a planetary gear set having a sun gear, a ring gear and planet gears positioned on a planet carrier;
    said ring gear adapted to drive said accessories at said constant ratio when said sun gear is held stationary;
    a spring applied rotary brake adapted to hold said sun gear stationary;
    a hydraulic drive adapted to progressively release said rotary brake in response to an increasing hydraulic pressure to permit controlled rotation of said sun gear;
    speed responsive means drivingly connected to said ring gear and adapted to generate a hydraulic pressure which increases with the speed of said ring gear.

2. In a drive system as recited in claim 1 wherein said speed responsive means comprises a positive displacement pump having a delivery conduit connected to said hydraulic device; an orifice adapted to by-pass fluid from said delivery conduit, the area of said orifice being selected to cause the fluid pressure in said conduit to increase with the speed of said pump at a predetermined rate.

3. In a drive system as recited in claim 2 further comprising temperature responsive means associated with said orifice to compensate for temperature changes in the hydraulic fluid.

4. In a drive system as recited in claim 1 wherein said hydraulic device comprises a hydraulic cylinder connected to said speed responsive device, a piston in said cylinder adapted to progressively release said rotary brake in response to an increasing pressure to provide controlled rotation of said sun gear.

5. In a drive system as recited in claim 1 which is adapted to provide a second constant ratio above a second predetermined speed, further comprising a one-way clutch positioned between said sun gear and said planet carrier to provide a direct drive ratio to said ring gear when the controlled rotation of said sun gear exceeds the speed of said planet carrier.

6. In a drive system adapted to be driven by a prime mover and adapted to drive accessory devices at a first substantially constant ratio, then at a substantially constant speed and then at a second substantially constant ratio depending upon the speed of the prime mover comprising:

a planetary gear set having a sun gear, a ring gear and planet gears positioned between the sun and ring gears;

said planet gears being adapted to be drivingly connected to said prime mover;

an output pulley drivingly connected to said ring gear and adapted to drive accessory devices;

a rotary friction brake means connected to said sun gear;

ring gear speed-responsive means associated with said friction brake;

a friction clutch operatively associated with said planet gears and said sun gear;

said speed responsive means comprising means holding said brake against rotation until the prime mover reaches a predetermined first speed at which time said means permits said brake to rotate at controlled speeds until said prime mover reaches a predetermined second speed and then said means permits said brake to freely rotate after said prime mover reaches said second speed;

said friction clutch being so constructed and arranged to lock said sun gear and said planet gears together when they are rotating at the same speed;

said speed responsive means further comprising:

a pump drivingly connected to said ring gear;

a hydraulic cylinder supplied with hydraulic fluid by said pump;

a piston in said cylinder and friction means associated with said hydraulic cylinder and connected to said piston;

said friction means applying clamping pressure to said brake means;

said clamping pressure decreasing as the speed of the ring gear increases above said first predetermined speed; and temperature-responsive means associated with said pump to compensate for temperature changes in the hydraulic fluid.

7. In a drive system adapted to be driven by a motor, the improvement comprising:

an output pulley;

multiple element gear means having one element adapted to be connected to the driving motor and another element connected to said output pulley;

means controlling the rotational speed of still another element so that at one range of engine speeds, the still another element is held against rotation, and at another range, the still another element rotates at a speed which increases with engine speed, until a speed when the still another element rotates at the same speed as the engine and at the same speed as said one element;

said controlling means comprising a friction brake and means actuating said friction brake;

said friction brake actuating means comprising a hydraulic system having a pump adapted to be driven by said output pulley for pumping hydraulic fluid and further comprising means for compensating for temperature changes in said hydraulic fluid;

means locking said still another element and said one element rotationally together;

said system providing a first linearly increasing drive ratio to the output pulley, then a generally uniform speed drive to the output pulley and then a second linearly increasing drive ratio to the output pulley.

* * * * *